No. 727,161. PATENTED MAY 5, 1903.
T. H. J. LECKBAND.
APPARATUS FOR CARBURETING AIR.
APPLICATION FILED JAN. 5, 1903.
NO MODEL.
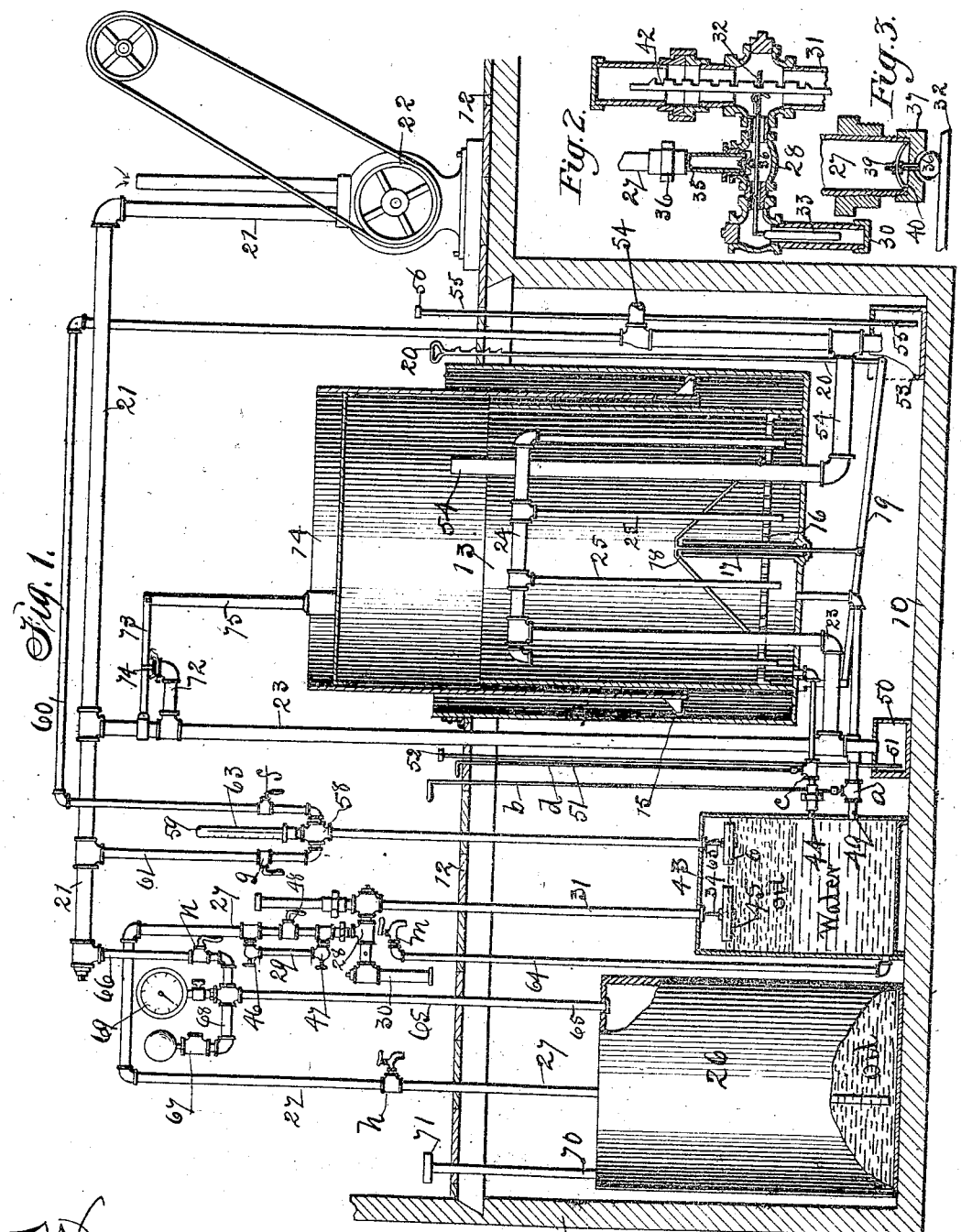
Witnesses:
L. L. Leibrock.
A. G. Hague.
Inventor: Theodor H. J. Leckband
By Thomas G. Orwig, Attorney.

No. 727,161.

Patented May 5, 1903.

UNITED STATES PATENT OFFICE.

THEODOR H. J. LECKBAND, OF DES MOINES, IOWA, ASSIGNOR OF ONE-HALF TO THE LECKBAND GAS COMPANY, OF MASON CITY, IOWA.

APPARATUS FOR CARBURETING AIR.

SPECIFICATION forming part of Letters Patent No. 727,161, dated May 5, 1903.

Application filed January 5, 1903. Serial No. 137,978. (No model.)

*To all whom it may concern:*

Be it known that I, THEODOR H. J. LECKBAND, a citizen of the United States, residing at Des Moines, in the county of Polk and State of Iowa, have invented a new and useful Apparatus for Carbureting Air, of which the following is a specification.

My object is to provide improved means for controlling air and oil in a carbureter as required to regulate the quality and quantity of gas produced at different times for streets, a building, or collection of buildings for lighting and heating purposes.

My invention consists in the construction, arrangement, and combination of elements and subcombinations, as hereinafter set forth, pointed out in my claims, and illustrated in the accompanying drawings, in which—

Figure 1 is a side elevation of the apparatus, partly in section, showing the relative positions of all the operative parts. Fig. 2 is an enlarged sectional view of automatic air and oil feeding mechanism for regulating the quality and quantity of gas produced at different times to supply variating demands. Fig. 3 is an enlarged sectional view that shows the construction and combination of a valve and a lever adapted to operate automatically in the feed mechanism.

The numeral 10 designates the bottom of a water-chamber adapted for submerging the main portions of the carbureter vessels, and 12 represents a floor fixed over the water-chamber. A double-walled tank 13 is fitted and fixed in an opening in the floor 12 and suspended in the chamber 10, and a bell 14 fitted in the tank and provided with a plurality of antifriction-rollers 15 on its exterior to contact with the interior of the outer wall of the tank to aid in facilitating the up and down motions of the bell and to maintain it perpendicular.

An air-mixer in the form of a perforated plate 16 is fitted in the tank 10 and to a tube 17, fixed to the bottom of the tank, and a frame 18, made of metal rods, fixed to the top of the plate, so that the plate can be raised and lowered by means of a lever 19, fulcrumed to the bottom of the tank and provided with a rod 20 at its free end, that is adjustably connected with the floor 12 by means of teeth adapted to engage the floor or in any suitable way, as required, for retaining the plate at different points of elevation relative to oil in the tank and the quality of gas to be produced.

A pipe 21 is connected with an air-pump 22 and a branch pipe 23 extended therefrom through the bottom of the tank 10 to near its open top and terminates in a lateral extension 24, to which extension are fixed a plurality of tubes 25 to extend downward through the perforated plate 16, as required, to discharge air into the oil below the mixer-plate 16.

An oil-tank 26 is connected with automatic feed mechanism as follows: A pipe 27, open at its bottom, is fixed in the top of the oil-tank to extend down to near the bottom of the tank and extended upward and arched at its top, and an automatic feed-regulating mechanism inclosed in tubes connected with its end by means of a T-coupling 28, as shown in Fig. 2. A glass tube or sight-feed 29 is connected with the pipe 27 above the coupling 28, as shown in Fig. 1. A chamber 30 for a weight has air-tight connection with one end of the T-coupling, a pipe 31 with the other end of the same coupling, as shown in Fig. 3, or in any suitable way, as required, for inclosing a lever 32, connecting a weight 33 with one end of the lever and a rod 34 with its other end. A tube 35 is connected with the lower end of the tube 27 by means of a union 36 and with the T-coupling 28, as shown in Fig. 2, or in any suitable way and a valve-seat 37, fixed to its lower end and within said coupling, and a valve 38, fitted to said seat and provided with a stem 39, that extends up through a bore in the seat and through an arched bearer 40, fitted in the tube 35, to retain the valve-stem perpendicular and to restrict the downward motions of the valve by means of a nut 41 on the end of the stem. The rod 34 has a plurality of notches at its upper end portion, and the long arm of the lever 32 has a single notch that admits the narrowed portions of the notched rod, as required, to adjustably connect the notched rod with the lever, and a leaf-spring 42, fixed to the lever, normally engages the rod 34, as required, to retain the rod connected with the lever. An air-tight tank 43 is connected with the lower end of the pipe 31 and with the bottom of the carbureter-tank 13 by a tube 44. To the bottom of the rod 34 is attached a float 45, that will by the rise and fall of oil in the tanks 43 and 13 actuate the lever 32, as required, to open and close the valve 38, by means of which the needed supply of oil is fed into said tanks automatically. Valves 46 and 47 are connected with the sight-feed 29 for closing communication therewith, and a valve 48, connected with the pipe 27, can be closed to stop the flow of oil downward and into the tank 43 whenever desired.

A tube 49 is fixed to the lower portion of the tank 43 and extended into the bottom of the carbureter-tank 13 to draw water from the carbureter-tank into the air-tight tank 43 and provided with a valve $a$, having a stem $b$ for operating the valve. The pipe 44 is also provided with a valve $c$ and stem $d$, projected upward therefrom, for closing communication between the tanks 10 and 43.

A water-tight drip-chamber 50 is connected with the lower end of the tube 23 and a tube 51 extended into said chamber and provided with a removable cap 52, so that water accumulated in the chamber may be discharged therefrom by removing the cap and forcing air into the chamber. A corresponding drip-chamber 53 is connected with the pipe 54, that extends from within the bell 14 and tank 13 to convey gas as required to supply burners in lamps in buildings or streets, and a pipe 55 connected with said chamber and provided with a removable cap 56 as a means for removing water and oil that may gather in said chamber by forcing air into the chamber.

A pipe 57 is connected with the top of the tank 43 and has a coupling 58 fixed to its top. A glass tube 59, provided with a scale, is fixed on top of said coupling, and a pipe 60 extended from the same coupling to the pipe 54, and a pipe 61 is fixed to other side of said coupling and connected with the pipe 21. The pipe 60 is provided with a valve $f$ and the pipe 61 with a valve $g$.

A float 62 is placed in the tank 43 and provided with a stem 63, that extends up through the pipe 57 and the glass tube 59 to indicate the amount of oil in the tank 43. The pipe 27 is provided with a faucet $h$ for drawing oil from the tank by forcing air into the tank to press oil up through the said pipe.

A pipe 64 is fixed to the lower end of the tank 43 and provided with a faucet $m$ for drawing oil from the tank by means of air forced into the tank from the pump 22 and through the pipes 21, 60, and 57.

A pipe 65 is connected with the oil-tank 26 and connected with the pipe 21 by a branch pipe 66, that has a valve $n$. A safety-valve 67 is also connected with the pipe 65 by means of a branch pipe 68. A register 69 is fixed on top of the pipe 65 to designate the air-pressure in the oil-tank 23.

A pipe 70 is fixed to the oil-tank 26 and provided with a removable cap 71 for filling oil into the tank.

A branch pipe 72 is connected with the pipe 23 and provided with a valve-seat at its end, and 73 is a valve fulcrumed to the pipe 23 and carries a valve 74, and a weighted bar 75 is pivoted to the end of the lever in such a manner that when the bell 14 rises to a certain limit the valve 74 will be automatically opened to let air escape, as required, to prevent the generation of a surplus of gas in the carbureter and its escape through the top of the tank 10.

Having thus described the purpose of my invention and the construction and function of each element and subcombination in the apparatus, its practical operation and utility will be understood by persons familiar with the art to which it pertains, and what I claim as new, and desire to secure by Letters Patent, is—

1. In an apparatus for carbureting air, an automatic oil-feeding device comprising a T-coupling, an air-tight chamber connected with one side of the coupling, a pipe connected with the other side of the coupling, a lever extended through the coupling, a weight pivoted to the end of the lever to depend in said air-tight chamber, a rod adjustably connected with the other end of the lever to extend through said pipe, a pipe fixed in the top of the coupling and provided with a valve-seat at its bottom and a valve above the lever and provided with a stem extended upward into the pipe, arranged and combined to operate in the manner set forth for the purposes stated.

2. In an apparatus for carbureting air, an automatic oil-feeding device comprising a T-coupling, an air-tight chamber connected with one side of the coupling, a pipe connected with the other side of the coupling, a lever extended through the coupling, a weight pivoted to the end of the lever to depend in said air-tight chamber, a rod adjustably connected with the other end of the lever to extend through said pipe, a pipe fixed in the top of the coupling and provided with a valve-seat at its bottom and a valve above the lever and provided with a stem extended upward into the pipe, in combination with an oil-tank and means for regulating the passage of oil from the tank into said pipe having a valve-seat in its bottom, arranged and combined to operate in the manner set forth for the purposes stated.

3. In an apparatus for carbureting air, an automatic oil-feeding device comprising a T-coupling, an air-tight chamber connected with one side of the coupling, a pipe connected with the other side of the coupling, a lever extended through the coupling, a weight pivoted to the end of the lever to depend in said air-tight chamber, a rod adjustably connected with the other end of the lever to extend through said pipe, a pipe fixed in the top of the coupling and provided with a valve-seat at its bottom and a valve above the lever and provided with a stem extended upward into the pipe, in combination with an oil-tank and means for regulating the passage of oil from the tank into said pipe having a valve-seat in its bottom, an air-tight tank connected with the bottom of said pipe in which a rod is adjustably connected with said lever and a float on the lower end of said adjustable rod, arranged and combined to operate in the manner set forth for the purposes stated.

4. In an apparatus for carbureting air, an automatic oil-feeding device comprising a T-coupling an air-tight chamber connected with one side of the coupling, a pipe connected with the other side of the coupling, a lever extended through the coupling, a weight pivoted to the end of the lever to depend in said air-tight chamber, a rod adjustably connected with the other end of the lever to extend through said pipe, a pipe fixed in the top of the coupling and provided with a valve-seat at its bottom and a valve above the lever and provided with a stem extended upward into the pipe, in combination with an oil-tank and means for regulating the passage of oil from the tank into said pipe having a valve-seat in its bottom, an air-tight tank connected with the bottom of said pipe in which a rod is adjustably connected with said lever and a float on the lower end of said adjustable rod, and a removable cap on top of said pipe, arranged and combined to operate in the manner set forth for the purposes stated.

5. In an apparatus for carbureting air, an automatic oil-feeding device comprising a T-coupling, an air-tight chamber connected with one side of the coupling, a pipe connected with the other side of the coupling, a lever extended through the coupling, a weight pivoted to the end of the lever to depend in said air-tight chamber, a rod adjustably connected with the other end of the lever to extend through said pipe, a pipe fixed in the top of the coupling and provided with a valve-seat at its bottom and a valve above the lever and provided with a stem extended upward into the pipe in combination with an oil-tank and means for regulating the passage of oil from the tank into said pipe having a valve-seat in its bottom, an air-tight tank connected with the bottom of said pipe in which a rod is adjustably connected with said lever and a float on the lower end of said adjustable rod, and a removable cap on top of said pipe, an air-pump, pipes communicating with the air-pump and the oil-tank and means for regulating the passage of air into the oil-tank, arranged and combined to operate in the manner set forth for the purposes stated.

6. In an apparatus for carbureting air, an automatic oil-feeding device comprising a T-coupling, an air-tight chamber connected with one side of the coupling, a pipe connected with the other side of the coupling, a lever extended through the coupling, a weight pivoted to the end of the lever to depend in said air-tight chamber, a rod adjustably connected with the other end of the lever to extend through said pipe, a pipe fixed in the top of the coupling and provided with a valve-seat at its bottom and a valve above the lever and provided with a stem extended upward into the pipe in combination with an oil-tank and means for regulating the passage of oil from the tank into said pipe having a valve-seat in its bottom, an air-tight tank connected with the bottom of said pipe in which a rod is adjustably connected with said lever and a float on the lower end of said adjustable rod, and a removable cap on top of said pipe, an air-pump, pipes communicating with the air-pump and the oil-tank and means for regulating the passage of air into the oil-tank, a pipe connecting the said air-tight tank with water-tank and means for feeding air into said air-tight tank for forcing oil into the carbureter water-tank, arranged and combined to operate in the manner set forth for the purposes stated.

THEODOR H. J. LECKBAND.

Witnesses:
R. H. ORWIG,
THOMAS G. ORWIG.